United States Patent [19]
Henderer

[11] Patent Number: 5,417,777
[45] Date of Patent: May 23, 1995

[54] ALLOY FOR BACKING STEEL OF A BIMETALLIC BAND SAW BLADE

[75] Inventor: Willard E. Henderer, Somers, Conn.

[73] Assignee: American Saw & Mfg. Company, East Longmeadow, Mass.

[21] Appl. No.: 199,539

[22] Filed: Feb. 22, 1994

[51] Int. Cl.6 .............................................. C22C 38/44
[52] U.S. Cl. ..................... 148/334; 148/335; 30/335; 30/345; 30/380; 30/356; 428/683
[58] Field of Search .................. 148/334, 335; 30/345, 30/380, 350; 428/683

[56] References Cited
FOREIGN PATENT DOCUMENTS

| | | | |
|---|---|---|---|
| 2014854 | 10/1970 | Germany | 148/334 |
| 5837156 | 3/1983 | Japan | 148/335 |

Primary Examiner—Deborah Yee
Attorney, Agent, or Firm—Chapin, Neal & Dempsey

[57] ABSTRACT

A bimetallic band saw blade has a high speed cutting edge welded to a backing band of a steel alloy containing the following elements percentages by weight:
Cr - 0.5% to no more than 1.5%
V - 0.10% to 0.75%
Mo - 1.5% to 2.5% wherein said backing band comprises a substantially lesser amount by weight of Chromium than Molybdenum the alloy also contains C, Si, Mn, Nb and/or Ni and Al in such varying amounts that the total alloy content, except for Fe and inevitable impurities, is in the range of 3.12% to 8.48%.

8 Claims, 1 Drawing Sheet

ALLOY FOR BACKING STEEL OF A BIMETALLIC BAND SAW BLADE

FIELD OF THE INVENTION

This invention is concerned with the backing steel used in fabricating bimetallic band saw blades and more particularly to an improved alloy having a long fatigue life while being relatively less costly than alloys heretofore available which have exhibited comparable properties of wear resistance and toughness.

BACKGROUND OF THE INVENTION

For many years the band saw blade industry has been using a steel alloy known in the trade as "D6A" as the backing steel in the manufacture of bimetallic band saw blades. The D6A alloy is an ultra high strength steel adapted to be used in the 260-290 ksi tensile strength range by hardening, or austenitizing, at 1550° F. and tempering at 400° F. These alloys were not effective for band saw blades when austenitized at 2000°-2250° F. and tempered at 800°-1100° F., the temperatures required for heat-treating the high speed cutting tool steel ("HSS") edge.

The problem of heat treating bimetallic blades comes about after the HSS alloy is welded generally by an electron beam welder along an edge of the backing band. Inasmuch as the HSS alloy of the cutting edge and the backing steel are welded together along the length of the blade, it is difficult, if not impossible, to obtain simultaneously the distinctive and necessary properties of HSS cutting tool steel on the one hand without bringing about a reduction of the flexibility, toughness and fatigue strength of the backing steel.. In recent years, while cutting hard-to-cut materials over protracted periods of time using bimetallic blades and when it has become necessary to replace the blade because of its failure, upon inspection of such blades, it has been determined that in many cases the failure occurred in the backing band and not the HSS cutting edge.

U.S. Pat. No. 2,565,264, which issued in 1951, relates to a tool steel with low alloy content, such as high speed steel 18-4-1. However, this patent does not relate to its use as the steel backing band for a bimetallic band saw blade, the subject of this invention, since that type of blade was not invented until about two decades later.

Among the more recent prior art: are U.S. Pat. Nos. 5,036,356 issued in 1991 to Kumagai and No. 5,091,264 issued in 1992 to Bohler which have directed their focus on alloys for use as the backing steel welded to high speed steel cutting edge material in fabricating bimetallic band saw blades. The patent to Bohler focuses on martensitically hardenable maraging steel containing, in relatively large quantities ranging from a minimum of 10% to a maximum 55% by weight total of the alloy elements, Ni, Co and Mo, which are three of the rarest and most expensive materials available. The Bohler patent discloses and claims that support strips 1 have at least 10% by weight of alloying components. In Table 1 (Column 4) and Table 3 (Column 50) the constituents of a tool steel and backing band, or support strip of Bohler are that generally the same materials are used in both the cutting and backing portions of such composite blades. The Bohler patent also discusses bimetallic band saw blades wherein a high speed steel HSS is electron beam welded to the backing strip. Usually, the welding step is followed by the tempering of that longitudinal section or zone hardened by the welding and by annealing steps. After the teeth are cut and set, the blade is hardened by heating to a temperature of 1120° C. which is maintained for fifty-five (55) seconds and then quenching the blade in oil. The blade was then tempered by heating to 560° C. and cooling in air for 1.2 hours and again by heating to 560° C. and cooling in air for one hour. Blades of that construction provide 71,000 load cycles prior to failure, but include large amounts of the following three alloy elements, i.e., Mo - 4.3%; Ni - 18.1%, and Co - 12.07% by weight.

The '356 Patent discusses the problem of shorter blade life of such band saw blades because the blades are subjected to relatively large loads of tensile stress, bending and torsional stress particularly when used in cutting difficult-to-cut materials such as super heat resistant steel and stainless steel. That patent discloses as the backing steel of the invention, a material in which the carbon is combined with carbide forming elements such as Chromium (Cr), Molybdenum (Mo), Tungsten (W), Vanadium (V) and Niobium (Nb). Despite the fact that Chromium is a rare and expensive element, the patentee teaches that "Cr must be added in amounts in excess of 3% by weight for the purpose of increasing the hardenability of the backing material and preventing the diffusion of C (Carbon) from the backing material to the high speed steel during the welding of the backing material to the high speed steel . . . ." The '356 Patent also indicates that in the composition of the present invention, "if a Vanadium equivalent exceeds 0.2%, VC (vanadium carbide) and/or NbC (niobium carbide) excessively remain in the structure after heat treatment and there is a tendency to. . . and decrease the fatigue strength."

It is the principal object of this invention to provide an improved bimetallic welded edge band saw having a backing steel which possesses as good or better performance characteristics including fatigue life than any comparable product previously available or disclosed in the prior art.

It is another object of this invention to provide a bimetallic band saw blade of the above type which involves the use of substantially lesser amounts of certain rare and expensive alloying materials to thereby provide a lower cost high performance bimetallic band saw blade.

This invention comprises a bimetallic band saw blade having a HSS cutting edge welded to a backing band of steel alloy containing the following materials in percentages by weight as follows:

Cr - 0.5% to no more than 1.5%
V - 0.10% to 0.75%
Mo - 1.5% to 2.5% the alloy also contains C, Si, Mn, Nb and/or Ni and Al in such varying amounts that the total alloy content, except for Fe and inevitable impurities, is in the range of 3.12% to 8.48%.

The above and other objects and advantages of this invention will be more readily apparent from the reading of the following description of an exemplary embodiment thereof taken in conjunction with the following drawings.

DETAILED DESCRIPTION OF THE PREFERRED EMBODIMENT

Figure 1:
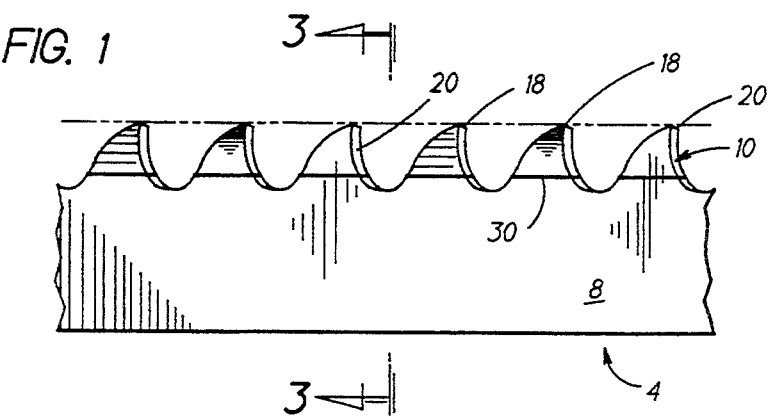
FIG. 1 is an elevational view of a bimetallic band saw blade of the type embodying this invention.
Figure 3:
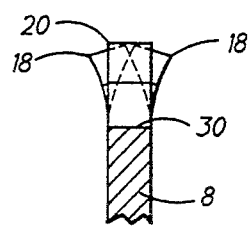
FIG. 3 is a section taken along line 3—3 of FIG. 1.
Figure 2:
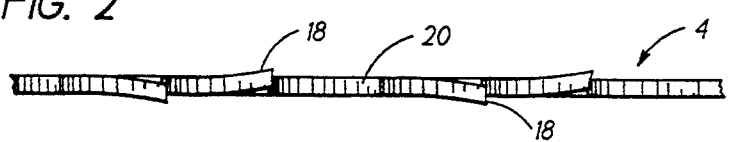
FIG. 2 is a top plan view of the blade of FIG. 1.

In FIG. 1 is shown a bimetallic band saw blade 4 of the type comprising this invention. The blade comprises a steel backing band 8 and a high speed steel (HSS) cutting edge 10. The cutting edge may either be of generally rectangular cross-section, as shown at 10, or it may be of a trapezoidal cross-section, as shown in dotted lines at 12 in FIG. 4. In either case, the HSS steel is preferably secured to the upper edge of the backing band 8 by electron beam welding along a weld line or zone 30 as disclosed in U.S. Pat. No. 3,593,600.

Figure 6:
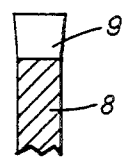
FIG. 6 is a front elevational view of a carbide tipped blade which is a further embodiment of this invention.
Figure 4:
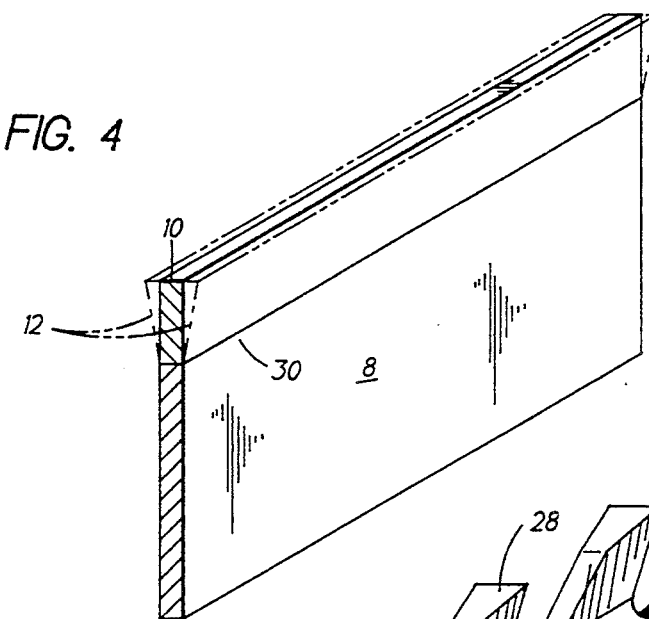
FIGS. 4 and 5 are perspective views illustrating two steps in the process of manufacturing a band saw blade in accordance with this invention.
Figure 5:
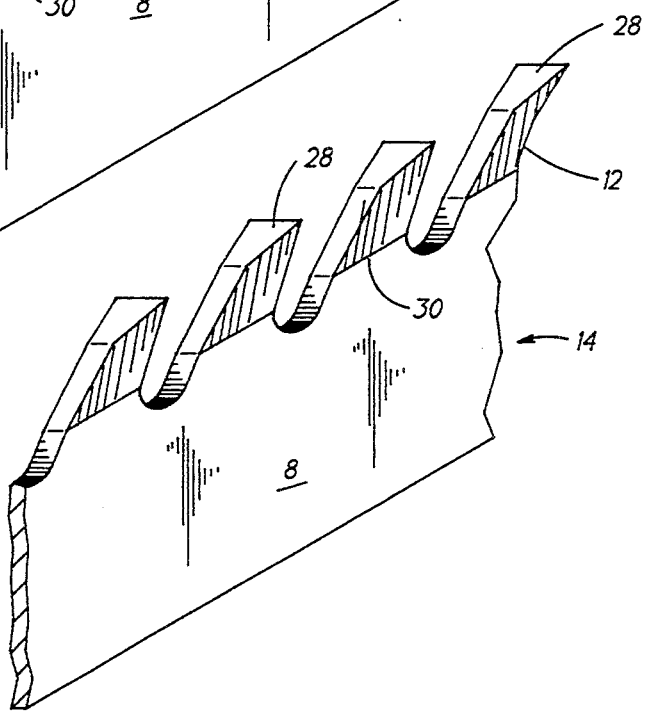

After the HSS strip 10 is applied to the backing strip, the composite strip is annealed by heating to 1500°–1600° F., holding it at that temperature for 2-3 hours and allowing to cool slowly to remove all the stresses in the metals of the backing band 8 and HSS strip 10 or 12 resulting from the welding process. Thereafter, the teeth 18 are formed by milling or grinding and certain of the teeth, as at 18, and may be set laterally out of the plane of the blade while other of the teeth 20 are not set and become the raker teeth of the blade. This invention is also applicable to carbide-tipped saw blades, as shown in FIG. 6, includes pieces of carbide 9 of a rectangular or tapered side edge configuration which are welded or brazed onto the upper, leading edge portion of each tooth of the saw blade 8. In accordance with this invention, the saw blade may, in its entirety, be composed of an alloy embodying the present invention and for purposes of this application, will be considered to be the "backing band" portion of the blade. In addition, as illustrated in FIGS. 4 and 5, this invention may be used for the backing band 8 to which a HSS strip of enlarged or tapered cross-section 12 may be welded or brazed to form a bimetallic blade so that when the teeth are ground they will, as shown at 28, be symmetrical relative the plane of the blade without the necessity of setting the teeth in a conventional manner. In any case, with the exception of the carbide tipped blade, after the teeth are formed, the bimetallic strip must be hardened by heat treating to approximately 2000°–2250° F. from one to ten minutes and then quenched in oil or a gas mixture in order to harden the HSS steel. Thereafter, the band saw is tempered by heating to below the critical temperature used for hardening of the HSS cutting edge or to a temperature on the order of 800°–1100° F. After heating, the band saw is allowed to air cool slowly to room temperature and the process may be repeated if necessary to achieve the desired end result.

In order to develop the optimum fatigue and strength properties for bimetallic band saw blades, the following specific amounts of alloying elements are added to the backing band steel in the following percentages by weight:

Chromium (Cr) has a relatively strong effect in increasing hardenability and is added in amounts of at least 0.50%. Cr precipitates as a carbide during tempering, but in comparison to other alloying elements, Cr has relatively weak secondary hardening effects on steel when tempered at the elevated temperatures required for the HSS edge of band saw blade.

It has been found that Cr has no effect on improving fatigue strength in amounts of from 1.0% to 3.2%. In addition, Cr is reported to have a tendency to promote grain growth with resulting embrittlement and therefore the use of Cr should be restricted in a backing material, considering the elevated austenitizing temperatures that band saw blades are subjected to. Further, Cr is an expensive and rare element and in high concentrations, it increases the difficulty to fabricate steel that is alloyed with it. Accordingly, the amount of Cr ranges from 0.5% up to 1.5%.

Molybdenum (Mo) produces strong secondary strengthening during tempering by forming carbide precipitates at the temperatures required for bimetallic band saw blades. Our tests indicate that Mo added in amounts of 2% significantly increase fatigue strength. However, large amounts will reduce the ductility of steel and render it unsuitable for band saw backing steel. Therefore, the practical range for Mo is from 1.5% to 2.5% in backing steel.

Vanadium (V) forms a fine sized precipitate during tempering and therefore contributes to strengthening when added in amounts as small as 0.10%. Additionally, Mo and V, when added in combination in alloy steels, increases secondary strengthening by forming complex carbides during tempering with a stronger effect than if Mo or V were added alone. However, V forms a stable carbide which is difficult to dissolve during hardening and if added in amounts greater than 0.75%, can result in residual carbides in the steel matrix which can act as crack initiation sites. Therefore, the optimum range for V is 0.10% to 0.75%.

Niobium (Nb) and Titanium (Ti) form extremely stable alloy carbides which do not readily dissolve in steel when hardened at temperatures required for the HSS of bimetallic band saw blades. Since those skilled in the art will recognize that Nb and Ti are equivalent and can be substituted one for the other, Nb and/or Ti can be added to effectively restrain grain growth and increase strength in concentrations up to 0.15% in terms of (Nb+Ti).

Carbon (C) hardens steel by forming martensite after quenching from the hardening temperature and during tempering, carbon forms carbide compounds with the elements Cr, Mo, W, V, Nb and Ti. The formation of carbides during tempering occurs in specific ratios of carbon to each carbide forming alloying element. Therefore, according to the amount of which each of these elements is added, sufficient carbon must be added to steel. According to the above stated limits on the carbide forming elements, carbon must be added in amounts of 0.27% to 0.48%.

Manganese (Mn) is present in all steels in concentrations of 0.3% or more to improve hardenability. Concentrations beyond 1.2% affect the ability to cold-work the material. Therefore, the preferred range of Mn is 0.3% to 1.2%.

Silicon (Si) acts as a deoxidizer and is commonly used in steel at 0.20%. However, when used in large amounts, Si forms non-metallic components, such as $SiO_2$ which can adversely affect fatigue life. With vacuum melting, it is not required to add Si for aleoxidation purposes. Therefore, according to the melting practice used in manufacturing back band material, Si can be added in amounts up to 0.50%.

Nickel (Ni) increases the retention of a soft austenite phase during quenching and therefore increases ductility and toughness. Ni offsets the effect of Cr, Mo, V and Si to reduce the transformation from ferrite to austenite during hardening of the steel. Ni is effective in these regards in amounts of 0.45% to 1.25%.

Aluminum (Al) is used as a aleoxidizer in small concentrations and by forming Al oxides or Al nitrides, it acts as a grain refiner during hot-working. Additionally, Al prevents blow holes and voids during the welding of the HSS edge to the backing steel in bimetallic band saw blades. In excessive amounts, these oxides can become crack initiation sites which reduces the strength of the steel. Due to this reason, Al should be limited to 0.15%.

As shown in the table set forth below, eight alloys (1-8) include various combinations of the nine elements discussed and listed across the top edge of the table. The alloy designated as "A" is a melt of D6A and the alloy "B" is made in accordance with the '356 Patent, as previously discussed herein.

Each of the eight alloys was used to produce a specimen and the hardness and fatigue life of each specimen was measured and are listed in the table. The hardness is measured in Rockwell C, (Rc) and the fatigue life was measured using hourglass shaped flat specimens having a 0.031 inch notch and which were subjected to an alternating tensile stress of 25 to 110 ksi (thousand pounds per square inch). The numerical value for the fatigue life, as set forth in the table, corresponds to the number of cycles of alternating stress the specimens withstood prior to failure.

| Alloy No. | C | Mn | SI | Cr | Mo | V | Nb | Ni | Al | Rc Hardness | Fatigue Life |
|---|---|---|---|---|---|---|---|---|---|---|---|
| PRIOR ART | | | | | | | | | | | |
| A | 0.40 | 0.76 | 0.27 | 0.97 | 1.00 | 0.13 | 0.01 | 0.51 | 0.09 | 50.6 | 46,774 |
| B | 0.35 | 0.72 | 0.37 | 3.21 | 2.18 | 0.36 | 0.01 | 0.66 | 0.05 | 54.3 | 109,648 |
| PRESENT INVENTION | | | | | | | | | | | |
| 1 | 0.33 | 0.75 | 0.39 | 0.97 | 0.99 | 0.13 | 0.01 | 0.51 | 0.05 | 49.9 | 37,154 |
| 2 | 0.15 | 0.74 | 0.38 | 0.96 | 0.99 | 0.33 | 0.01 | 0.52 | 0.04 | 47.9 | 30,903 |
| 3 | 0.31 | 0.72 | 0.36 | 0.96 | 1.00 | 0.46 | 0.01 | 0.52 | 0.04 | 49.9 | 35,481 |
| 4 | 0.30 | 0.72 | 0.37 | 0.96 | 1.00 | 0.48 | 0.10 | 1.03 | 0.05 | 51.2 | 46,774 |
| 5 | 0.22 | 0.73 | 0.38 | 0.95 | 1.00 | 0.50 | 0.10 | 0.51 | 0.05 | 50.2 | 42,658 |
| 6 | 0.29 | 0.71 | 0.37 | 0.95 | 1.99 | 0.51 | 0.01 | 1.02 | 0.05 | 54.4 | 114,815 |
| 7 | 0.32 | 0.72 | 0.38 | 0.95 | 1.99 | 0.50 | 0.10 | 0.53 | 0.05 | 53.7 | 104,713 |
| 8 | 0.29 | 0.69 | 0.37 | 0.95 | 0.99 | 0.73 | 0.01 | 0.50 | 0.05 | 48.8 | 48,978 |

From the above data, it will be noted that alloys 6 and 7 embodying this invention and alloy "B" of the prior art are quite comparable in hardness and fatigue life in spite the fact that alloy "B" required 3.21% by weight of Cr and 2.18% by weight Mo, whereas alloys 6 and 7 utilized only 0.95% Cr and 1.99% Mo. The only other significant differences between,, these materials is that under the present invention, 0.5-0.51% by weight of V was used as compared with 0.36% by weight V of the prior art "B".

In general, by this invention, a comparable backing band alloy has been obtained which has a blade life equal to or greater than any prior art bimetallic band saw blade of which we are aware. Moreover, this alloy constitutes an improvement over the prior art inasmuch as the cost of the alloying elements are substantial less than the cost of the elements used in alloy "B".

Having thus described my invention, what is claimed is:

1. An improved bimetallic band saw blade having a high speed steel cutting edge and a backing steel band welded thereto, saw teeth formed along the high speed cutting edge including cutting tips and gullets, said cutting tips being formed in the high speed steel edge and-the gullets extending into the backing band, said backing band comprising, by weight from 0.5% to no more than 1.50% Chromium (Cr), 0.10% to 0.75% Vanadium (V), 1.5% to 2.50% Molybdenum (Mo) and wherein said backing band comprises a substantially lesser amount by weight of Chromium than Molybdenum, the backing band alloy also containing Carbon (C), Manganese (Mn) and Nickel (Ni) in such varying amounts that the total alloy content of the backing band, except for iron and inevitable impurities, is in a range of 3.12% to 8.84% by weight.

2. An improved bimetallic saw blade, as set forth in claim 1, in which the backing band in which the said backing band comprises by weight 1.75% to 2.5% Molybdenum also contains Silicon (Si), Niobium (Nb) and Aluminum (Al), whereby said total alloy content is in a range of 3.12% to 8.84% by weight.

3. An improved bimetallic band saw blade, as set forth in claims 1 or 2, in which after welding the cutting edge steel to the backing band in which said backing band comprises 1.75% to 2.5% by weight of Molybdenum and the quantity by weight of Chromium is on the order of one-half that of the Molybdenum to form said blade, said blade is annealed and then hardened by heating to a temperature in the range of 2000°-2250° F., the blade is maintained at that temperature for one to ten minutes and quenched, the blade is then tempered by heating to a temperature in the range of 800°-1100° F., held at that temperature for approximately for two to three hours and then air-cooled to room temperature.

4. An improved bimetallic band saw blade, as set forth in claim 1, in which the backing band additionally comprises 0.45% to 1.25% by weight nickel (Ni) and in which the alloy content provided by the Carbon (C) and Manganese (Mn) is in the range of 0.57% to 1.68% per weight.

5. An improved bimetallic saw blade as set forth in claim 2, in which the backing band additionally comprises 0.45% to 1.25% by weight nickel (Ni) and in which the remaining alloy content by weight provided by the Carbon (C), Silicon (Si), Manganese (Mn), Niobium (Nb) and Aluminum (Al) is in the range of 0.57% to 2.48%.

6. An improved bimetallic saw blade as set forth in claims 4 or 5, in which the backing band additionally comprises by weight Carbon (C) 0.27% to 0.48%, Silicon (Si) up to 0.50%, Manganese (Mn) 0.30% to 1.20%, Niobium (Nb) up to 0.15% and Aluminum (Al) up to 0.15%.

7. An improved bimetallic saw blade as set forth in claim 6, wherein the tempering of said blade is repeated.

8. An improved bimetallic saw blade as set forth in claims 1, 2, 5 or 6, in which Titanium (Ti) is substituted for at least a portion of said Niobium (Nb).

* * * * *